3,112,340
PROCESS FOR THE PRODUCTION OF
ADIPOMONONITROLIC ACID
Julius Jacob Fuchs, Charleston, W. Va., assignor to
E. I. du Pont de Nemours and Company, Wilmington,
Del., a corporation of Delaware
No Drawing. Filed Apr. 1, 1960, Ser. No. 19,159
2 Claims. (Cl. 260—531)

This invention is concerned with a process for the synthesis of adipomononitrolic acid (6-nitro-6-oximo hexanoic acid). More particularly, this invention is concerned with a process for the oxidation of cyclohexanol, cyclohexanone, and mixtures thereof with aqueous nitric acid at temperatures above 35° C. to produce adipomononitrolic acid in high yield.

Adipomononitrolic acid and its synthesis from cyclohexanol by oxidation at 20°–25° C. with aqueous nitric acid having a concentration from about 25% to 70% $HNO_3$ and above are disclosed in U.S. Patent 2,881,215 issued April 7, 1959 to Henry C. Godt, Jr. A full description of this synthesis is set forth in an article by H. C. Godt, Jr., and J. F. Quinn appearing in the Journal of the American Chemical Society, volume 78, pages 1461–1463 (1956). By this process, crude adipomononitrolic acid was obtained by Godt in yields of 53–63% with reaction times of 15 to 30 minutes. These authors state that no evidence has been found for the presence of a nitrolic acid when operating at temperatures above 35° C. such as are normally employed for the nitric acid oxidation of cyclohexanol. Thus, this process suffers from poor yields and slow reaction times, deficiencies which make it relatively expensive to operate.

Therefore, it is an object of the subject invention to provide a process for the synthesis of adipomononitrolic acid from cyclohexanol, cyclohexanone, or mixtures thereof by nitric acid oxidation under conditions which will provide a high yield of the nitrolic acid at a rapid rate. It is another object of the present invention to provide a process for the production of adipomononitrolic acid by a process for the nitric acid oxidation of cyclohexanol, cyclohexanone, or mixtures thereof which can be carried out at temperatures above 35° C. Other objects and advantages of this invention will appear hereinafter.

It has now been discovered that the objects and advantages of this invention can be achieved by a process for the production of adipomononitrolic acid which comprises rapidly adding at least one compound from the group consisting of cyclohexanol and cyclohexanone to a turbulent aqueous solution of nitric acid having a concentration of between 40% and 60% $HNO_3$, maintained at a temperature between 40° and 65° C., and subsequently quenching the oxidation reaction by dilution with ice water after a reaction time of from 5 to 300 seconds, and recovering adipomononitrolic acid from the reaction mixture. By this process, cyclohexanol and cyclohexanone can be converted to adipomononitrolic acid in yields of 66% to 80% in a very short reaction time.

The success of this process depends upon several critical features. The temperatures must be controlled within the narrow limits of 40° to 65° C., preferably 50°–60° C., the cyclohexanol or cyclohexanone must be added rapidly with good mixing, the reaction must be immediately quenched when the maximum yield of adipomononitrile has been achieved, and the concentration of $HNO_3$ in the aqueous nitric acid must be kept in the range of 40% to 60%. If these conditions are not rigorously observed, the adipomononitrolic acid will be oxidized at these temperatures to adipic acid with the loss of nitrogen as $N_2$ and $N_2O$ as in prior art processes for the nitric acid oxidation of cyclohexanol and cyclohexanone.

Either cyclohexanol or cyclohexanone or mixtures of the two can be employed in the process of this invention. The mixtures of the two obtained by liquid phase, air oxidation of cyclohexane can suitably be employed.

In this process, the molar proportion of $HNO_3$ to cyclohexanol and cyclohexanone can be varied over a range of from about 10 to about 200 moles of $HNO_3$ per mole of the compound being oxidized. Preferably about 20 moles of $HNO_3$ as aqueous 50–55% $HNO_3$ are employed per mole of cyclohexanol and cyclohexanone.

While the process of the invention can be carried out batchwise, the more desirable commercial method is to employ a continuous reactor. Thus, the process can be carried out in a tubular reactor through which a turbulent stream of aqueous nitric acid is passed while cyclohexanol and cyclohexanone are rapidly injected into the turbulent stream through a nozzle. Effluent from this reactor then is passed into agitated ice water to quench the reaction, and the adipomononitrolic acid is recovered by filtration, centrifugation, or extraction, and the dilute $HNO_3$ is concentrated and recycled.

The following examples are provided to further illustrate the process of this invention and the advantages achieved thereby. These runs were carried out in small batch reactors for convenience in controlling variables and analyzing results.

EXAMPLE 1

In this example, a series of runs were made in which 0.002 mole batches of cyclohexanol were rapidly added to rapidly agitated 50% aqueous $HNO_3$ solutions (0.004 mole) containing 0.3% Cu and 0.1% $NH_4VO_3$ maintained at 50° C. The oxidations were quenched with ice water (20 cc.) after varying reaction times as indicated in Table 1. For convenience, the yields of adipomononitrolic acid were determined by making the diluted reaction mixture alkaline with NaOH and analyzing for nitrolic acid by ultraviolet absorption. The UV analysis is based upon the absorption of ultraviolet light at 335 m$\mu$ by the sodium salt of adipomononitrolic acid.

Table 1

YIELDS OF ADIPOMONONITROLIC ACID
AT 50° C./50% $NHO_3$

| Reaction time, seconds: | Yield, percent |
|---|---|
| 15 | 40 |
| 30 | 67 |
| 60 | 74 |
| 120 | 68 |
| 180 | 59 |
| 300 | 43 |

From the data in Table 1, it is evident that under these conditions a maximum yield of about 75% is achieved in 60 seconds' reaction time.

EXAMPLE 2

Another series of runs was made following the procedure of Example 1, but with the 50% aqueous $HNO_3$ containing 0.3% Cu and 0.10% $NH_4VO_3$ maintained at 40° C. The product was analyzed as in Example 1. The results as shown in Table 2.

Table 2
YIELDS OF ADIPOMONONITROLIC ACID AT 40° C./50% HNO₃

| Reaction time, seconds: | Yield, percent |
|---|---|
| 30 | 55 |
| 60 | 65 |
| 90 | 69 |
| 180 | 71 |
| 300 | 69 |
| 480 | 61 |

From the data presented in Table 2, it can be seen that at 40° C., the reaction is much slower than at 50° C., and the maximum yield achievable is somewhat lower than at 50° C. The reaction can be somewhat accelerated by increasing the concentration of $HNO_3$ to 55%.

For continuous operation in a tubular reactor where still shorter times can conveniently be achieved, the concentration of $HNO_3$ can be increased to 60% and the reaction temperature can be raised to 55° C. and yields adipomononitrolic acid of about 80% achieved at reaction times under 15 seconds, preferably about 5 seconds.

EXAMPLE 3

In this example, two series of runs were made in which about 0.44 g. (0.004 mol) of wet cyclohexanone-cyclohexanol (10% $H_2O$), obtained from air oxidation of cyclohexane, was instantly added to 100 g. of rapidly agitated 45.25% aqueous nitric acid (0.72 mol) containing 0.3% copper and 0.1% $NH_4VO_3$ maintained at 55° C. and at 60° C. The oxidations were quenched with ice water to about 10° C. after varying reaction times and analyzed as in Example 1. Results are shown in Table 3. Yields are expressed as grams adipomononitrolic acid per gram dry cyclohexanone-cyclohexanol charged.

Table 3
YIELDS OF ADIPOMONONITROLIC ACID FROM COMMERCIAL CYCLOHEXANOL-CYCLOHEXANONE MIXTURES

| 55° C.—45.25% HNO₃ | | 60° C.—45.25% HNO₃ | |
|---|---|---|---|
| Reaction time (seconds) | Yield g./g. charge | Reaction time (seconds) | Yield g./g. |
| 10 | 0.82 | 10 | 1.09 |
| 30 | 1.08 | 15 | 1.17 |
| 60 | 0.85 | 15 | 1.26 |
| 90 | 0.80 | 15 | 1.26 |
| 120 | 0.475 | 30 | 0.79 |
|  |  | 45 | 0.62 |

In contrast with the above process, nitric acid oxidations of cyclohexanol at 20° C. give lower yields of adipomononitrolic acid and require much longer reaction times. This is illustrated by the following example:

EXAMPLE 4

In this example, a series of runs was made in which 0.002 mole batches of cyclohexanol were rapidly added to solutions of 0.04 mole of aqueous $HNO_3$ containing 0.3% Cu and 0.1% $NH_4VO_3$ having concentrations varying from 50% to 75% $HNO_3$ and maintained at 20° C. The runs were quenched with 20 cc. ice water after varying reaction times and the yields of adipomononitrolic acid determined as in Example 1. The results are shown in Table 4.

Table 4
YIELDS OF ADIPOMONONITROLIC ACID AT 20° C.

| Reaction time, minutes | Yields, % | | | |
|---|---|---|---|---|
| | 50% HNO₃ | 60% HNO₃ | 67% HNO₃ | 75% HNO₃ |
| 5 | 33 | 50 | 55 | 44 |
| 8 |  |  | 60 |  |
| 10 | 47 | 66 | 61 | 48 |
| 12 | 50 |  |  |  |
| 15 | 44 | 60 | 52 | 30 |

From the data of Table 4 it can be seen that the optimum concentration of $HNO_3$ at 20° C. is about 60% and that the optimum yield achieved under most favorable conditions is 66%. In order to achieve this optimum yield at 20° C., a relatively long reaction time of 10 minutes is required. Thus the process of the subject invention achieves improvements in yield at very much shorter reaction times, thus providing a significantly lower cost route to adipomononitrolic acid.

Adipomononitrolic acid is useful as an intermediate in the synthesis of a number of valuable products. As an example, it can be converted into adipic acid and hydroxylamine by processes disclosed in copending U.S. applications S.N. 19,162 and S.N. 19,177, both filed on April 1, 1960, by J. J. Fuchs, thus providing new routes to these valuable chemicals at substantial savings in manufacturing costs.

I claim:
1. A process for the production of adipomononitrolic acid which comprises rapidly adding at least one compound from the group consisting of cyclohexanol and cyclohexanone to an excess of a turbulent aqueous solution of nitric acid, having a concentration of between 40% and 60% $HNO_3$ said $HNO_3$ being employed at a ratio of from about 10 to about 200 moles per mole of compound being oxidized, and said aqueous solution of nitric acid being maintained at a temperature between 40° and 65° C. and subsequently, after a reaction time of from 5 to 300 seconds, quenching the oxidation reaction by dilution with an excess of ice water sufficient to reduce the temperature of the reaction mixture to a temperature in the range of 0° to 10° C., and recovering adipomononitrolic acid from the reaction mixture.

2. A continuous process for the production of adipomononitrolic acid which comprises rapidly injecting a mixture consisting essentially of cyclohexanol and cyclohexanone into an excess of a turbulently flowing stream of aqueous nitric acid having a concentration in the range of 40%–60% $HNO_3$, said $HNO_3$ being employed at a ratio of about 20 moles per mole of compound being oxidized, and said aqueous nitric acid being maintained at a temperature between 50° and 60° C., and subsequently, after a reaction time of from 5 to 60 seconds, quenching the oxidation reaction by passing the reacting mixture into an excess of ice water sufficient to reduce the temperature of the reaction mixture to a temperature in the range of 0° to 10° C., and recovering adipomononitrolic acid from the reaction mixture.

References Cited in the file of this patent
UNITED STATES PATENTS

| 2,719,172 | Nebe et al. | Sept. 27, 1955 |
| 2,881,215 | Godt | Apr. 7, 1959 |

OTHER REFERENCES

Godt et al.: Journal of the American Chemical Society, volume 78, pp. 1461–1463 (1956).